United States Patent [19]
Rayborn

[11] Patent Number: 5,924,380
[45] Date of Patent: Jul. 20, 1999

[54] PROTECTED FEEDING AND WATERING SYSTEM FOR UPLAND GAME BIRDS

[76] Inventor: Gary David Rayborn, P.O. Box 1195, Wilkesboro, N.C. 28697

[21] Appl. No.: 08/993,184

[22] Filed: Dec. 18, 1997

[51] Int. Cl.[6] .......................... A01K 31/00; A01K 31/07
[52] U.S. Cl. ........................ 119/51.5; 119/751; 119/429; 119/464; 119/469
[58] Field of Search .................. 119/51.5, 51.01, 119/55, 70, 752, 59, 751, 63, 57.9, 429, 472, 473, 452, 454, 706, 417, 421, 702, 707, 459, 475, 478, 469, 464, 428, 453

[56] References Cited

U.S. PATENT DOCUMENTS

| | | | |
|---|---|---|---|
| 1,215,048 | 2/1917 | Moyle | 43/61 |
| 2,518,536 | 8/1950 | Faulkner | 119/77 |
| 2,567,664 | 9/1951 | Ewell | 119/330 |
| 2,896,575 | 7/1959 | Scruggs | 119/57.9 |
| 2,918,901 | 12/1959 | Poulsen | 119/57.9 |
| 3,094,101 | 6/1963 | Porter | 119/752 |
| 3,334,614 | 8/1967 | Gass et al. | |
| 3,699,925 | 10/1972 | Van Dongen | |
| 3,712,267 | 1/1973 | Moliterni | |
| 3,785,343 | 1/1974 | Baratta | |
| 3,865,082 | 2/1975 | Lovitz et al. | |
| 4,046,108 | 9/1977 | Balgemann et al. | |
| 4,167,917 | 9/1979 | Noll | |
| 4,384,547 | 5/1983 | Mattox | |
| 4,846,110 | 7/1989 | Reynolds | |
| 5,186,122 | 2/1993 | Phillips et al. | |
| 5,320,064 | 6/1994 | Selstad | |
| 5,423,290 | 6/1995 | Payne | |
| 5,555,843 | 9/1996 | Harmon | 119/57.8 |

*Primary Examiner*—Jack W. Lavinder
*Assistant Examiner*—Yvonne R. Abbott
*Attorney, Agent, or Firm*—Mills Law Firm PLLC

[57] ABSTRACT

This invention is a protected enclosure to allow upland game birds including bobwhite quail to be introduced into and to thrive in the wild with low mortality rate. This is accomplished through the use of an acclimation portion where the birds become used to feeding and watering in the protected enclosure while being allowed to ingress and egress between the acclimation portion and the feeding and watering portion. Provision is made for one or more call birds to be isolated after the acclimation period upon initial introduction into the wild. The call bird or birds can then be reunited with the covey. Commercially available cooked ration can be used which allows vitamins, minerals and other supplements to be added to the normal diet of the birds.

11 Claims, 7 Drawing Sheets

PROTECTED FEEDING AND WATERING SYSTEM FOR UPLAND GAME BIRDS

FIELD OF INVENTION

This invention relates to upland game birds and more particularly to protected feeding and watering systems for such birds.

BACKGROUND OF INVENTION

There are many different upland game birds such as quail, chuckars, Hungarian partridge, grouse, pheasants, and the like. The term "quail" refers to several birds in the grouse family that live in North America. The best known of these are bobwhite quail. The protected feeding and watering system of the present invention will be described as it is used in conjunction with this type of quail.

More specifically, the bobwhite is the only quail native to the area east of the Mississippi River where they are found from the Gulf states to southern Ontario. These birds live in groups called coveys and they nest on the ground. Their feed in nature is weed seeds, grain, wild fruit and insects.

With the approach of danger, a covey of quail will rise and scatter. Since quail have relatively short wings which beat very rapidly, the covey rise is very fast and startlingly noisy. Because of this rapid rise, quail usually only fly 100 to 150 yards. Once the actual or perceived danger has passed, the birds begin their whistle like "Bob White" gathering call. A male or rooster bird usually calls the covey back together. Coveys of quail roost on the ground in a circle, tails pointing inwardly and heads outwardly. The covey thus can watch for predators 360° while roosting.

Although the covey roost is usually in a fairly open area so the birds can rapidly depart on a rise, these roosts are usually near a thicket to give them predator protection and cover.

In the wild, coveys of quail will scavenge for food during the middle of the morning and the middle of the afternoon while going to water during the middle of the day and late in the afternoon. Thus coveys of quail spend most of their waking hours either feeding or watering, all the while trying to be alert for dangers such as predators.

Coveys of quail that are pen raised and released in the wild usually have a fifty percent mortality rate in the first three to four days. Experience has shown that releasing birds into the wild using the present invention, there is extremely low mortality rate over extended periods of time.

The bobwhite quail populations have declined in the last 35 to 40 years and have plummeted in the last 15 to 20 years.

The widespread use of agricultural pesticides and other chemicals have contributed to the decline in populations. In recent years pesticides such as DDT have been banned while natural predators such as hawks, falcons, and several other species that do not today have natural enemies of their own have been protected, re-introduced, and have proliferated. Also, animals such as fox have been introduced into normal quail habitat for fox hunting and other purposes. These and other predators have also greatly contributed to declines in quail populations.

In addition to the patent references hereinafter discussed, some attempts have been made to provide quail management systems but it is the consensus of authorities on the subject that although such systems are usually expensive, none has been considered successful.

CONCISE EXPLANATION OF REFERENCES

U.S. Pat. No. 117,005 to Barton C. Smith discloses an improvement in animal trap that is rectangular in shape, however, this is not to protect the animals from predators and is not intended to allow the animals to freely ingress and egress.

U.S. Pat. No. 885,531 to John W. Salomons discloses a water tank for poultry shipping coops. These coops are not for predator protection nor are they intended to allow the birds to freely ingress and egress during part of the use cycle.

U.S. Pat. No. 1,215,048 to William James Moyle is considered of interest in that it discloses a bird trap with a decoy chamber that is used to call the birds. Again, this is a trap rather than a protection system.

U.S. Pat. No. 2,896,575 to Charles H. Scruggs is considered of interest in that it discloses a quail feeder that is nothing more than a roofed container mounted low to the ground but is otherwise not considered pertinent to the present invention.

U.S. Pat. No. 2.567,664 to Willis G. Ewell is considered of interest in that it discloses a rather complicated chicken calling device. Again, this is not for the protection of upland game birds while feeding and watering.

U.S. Pat. No. 2,918,910 to William E. Poulsen is considered of interest in that it discloses an automatic wild bird feeder with means for preventing birds above a predetermined weight from partaking of the food.

U.S. Pat. No. 3,094,101 to Ann L. Porter is considered of interest in that it discloses an apparatus for restraining animals, particularly rodents during laboratory processing and more particularly to apparatus for restraining rats during laboratory studies.

U.S. Pat. No. 2,518,536 to Thomas K. Faulkner discloses a poultry watering means with openings in the side wall to preclude contamination of the water by litter from the pen floor.

Finally, U.S. Pat. No. 5,555,843 to William D. Harmon discloses a multi-purpose feeder in the form of a striker-feeder wherein when an animal bumps a primary tube, feed within the bucket falls through a hole in the bottom of such bucket.

BRIEF DESCRIPTION OF INVENTION

After much research and study into the above mentioned problems, the present invention has been developed to provide a protected feeding and watering system for upland game birds in general, and bobwhite quail in particular.

This invention provides an almost completely predator proof feeding and watering enclosure for the birds. When they leave the enclosure during the day they will concentrate more on being aware of predators than searching for food and water.

In the case of quail, the covey will roost outside of the enclosure in the normal tail in, head out covey circle which is 360° awareness of approaching danger.

An acclimation portion is temporarily connected to the feeding and watering enclosure until the birds become used to feeding and watering in the enclosure. The acclimation portion can then be removed, the feeding and watering enclosure taken to the restoration area and the birds allowed to freely ingress and egress into and therefrom. The call bird can be placed in a call bird section until the birds become accustomed to their wild surroundings. The call birds can then be allowed to rejoin the covey.

Although natural feed can be used in the present invention, cooked ration with added vitamins and minerals is the feed of choice.

In view of the above, it is an object of the present invention to provide an upland game bird restoration system that allows the birds to feed and water protected from predators.

Another object of the present invention is to provide a system of reintroducing upland game birds to the wild including means for acclimating the birds to the protected water and feeding system.

Another object of the present invention is to provide a feeding and watering system for upland game birds being restored to the wild including means for holding one or more call birds at the beginning of the reintroduction process.

Other objects and advantages of the present invention will become apparent and obvious from a study of the following description and the accompanying drawings which are merely illustrative of such invention.

DETAILED DESCRIPTION OF INVENTION

Figure 1:
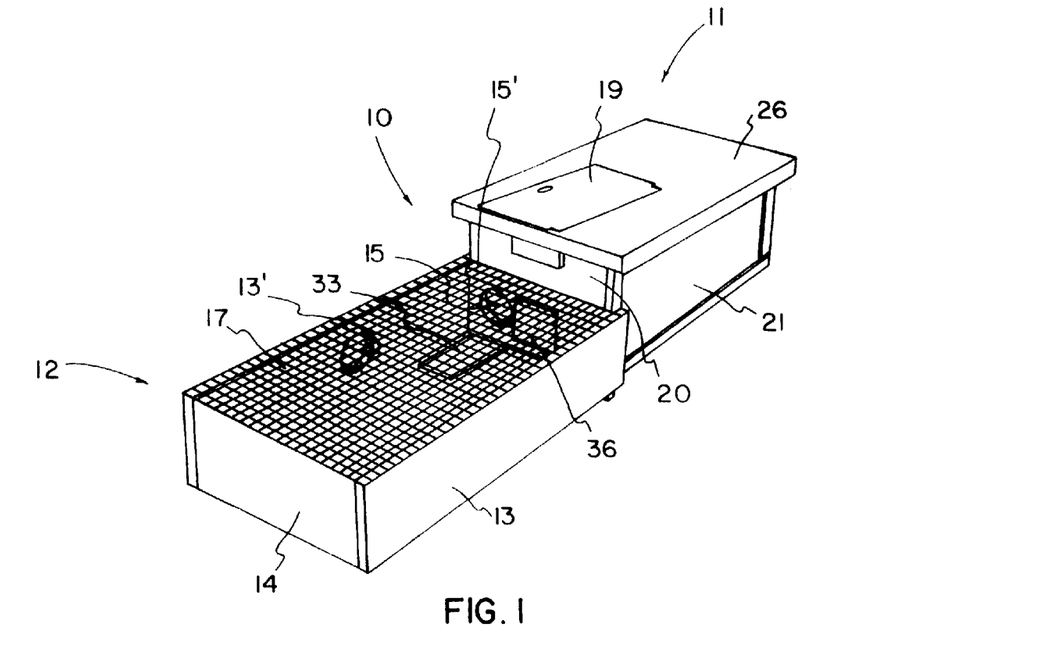
FIG. 1 is a perspective view of the protected feeding and watering system of the present invention with the feeding and watering portion operatively connected to the acclimation portion.

The protected feeding and watering system of the present invention, indicated generally at 10, is composed of a feeding and watering portion, indicated at 11, and an acclimation portion, indicated generally at 12.

Figure 2:
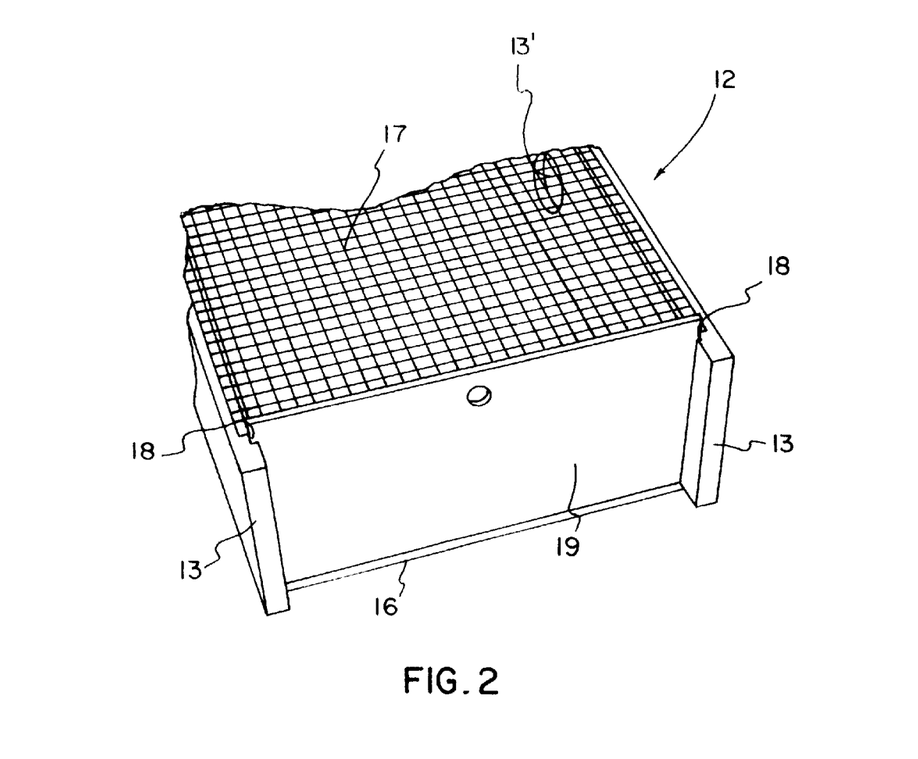
FIG. 2 is an enlarged perspective view of the acclimation section with the blocking board covering the open end thereof.

The acclimation portion is composed of side walls 13 and an end wall 14. The opposite end is open as indicated at 15 with upper and lower cross braces 15.

A bottom screen 16 and a top screen 17 are attached to the bottom edge and top edge, respectively, of the side walls 13, end wall 14 and cross braces 15'. This screen is so sized that the droppings from the birds can pass therethrough and is either manufactured from or coated with a relatively soft plastic or similar material to prevent the bird from being injured since screens of this type are commercially available and well known to those skilled in the art, further discussion of the same is not deemed necessary.

Vertical slots 18 are formed on the interior surface of the side walls 13 adjacent open end 15 and are adapted to slidingly receive blocking board 19 as can clearly be seen in FIG. 2. As can also be seen clearly in FIG. 2, the ends of the side walls 13 and the end of the bottom screen 16 project outwardly beyond backing board 19.

The wall through which the birds normally ingress and egress is herein referred to as the front wall 20. The box-like feed and watering portion 11 is composed of the front wall 20, elongated right side wall 21, elongated left side wall 22 and rear wall 23 with a fixed bottom 24 and a top opening 25.

Figure 3:
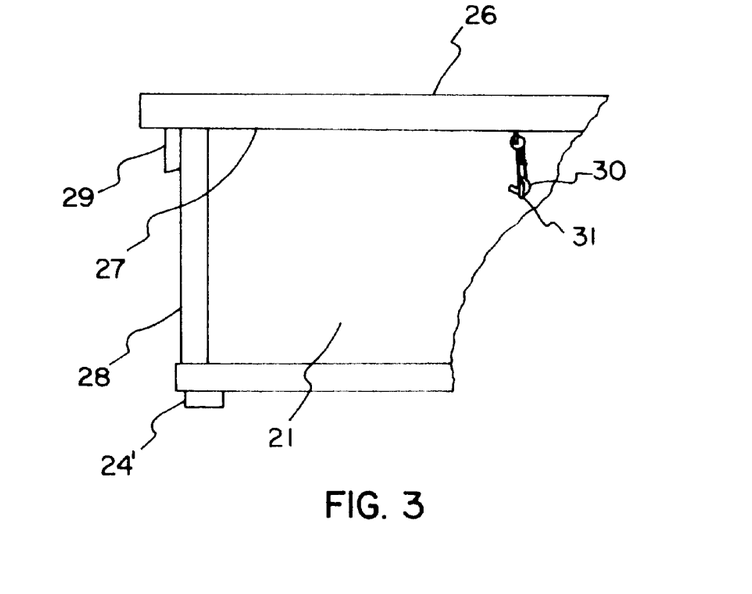
FIG. 3 is a fragmented side elevational view of the feeding and watering section.
Figure 4:
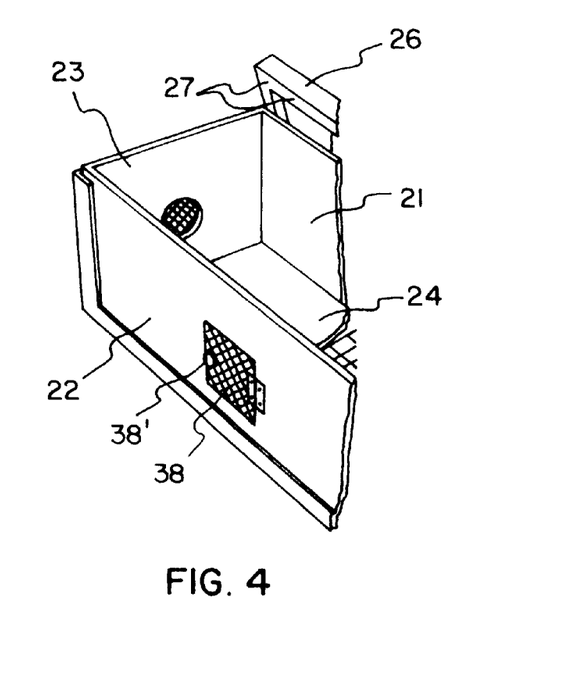
FIG. 4 is a perspective view of such section with the top removed.

A water proof top closure 26 is provided to cover the opening 25. This top has a peripheral flange 27 that fits down over the upper portion of the front, rear and side walls of the box-like feeding and watering portion 11. The vertical corner reinforcements 27 terminate below the upper edges of the front, rear and side walls as clearly seen in FIGS. 12 and 13. The peripheral flange 27 of top 26 is juxtaposed to the corner reinforcements 28 when in closed position as clearly can be seen in FIG. 3. It should also be noted that the lifting handles 29 on the exterior of the front and rear walls are spaced from the upper edge thereof, again as clearly seen in FIGS. 12 and 13.

Figure 5:
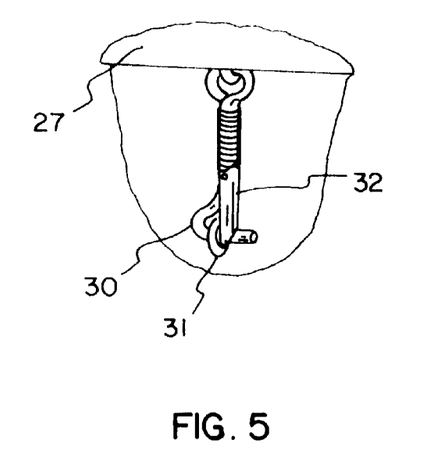
FIG. 5 is an enlarged view of the top to side latching means.

A swivel hook 30 and eye 31 is used to hold the top closure 26 in place on the feeding and watering portion 11 of the protected feeding and watering system 10 of the present invention. The hook portion 30 of the hood and eye includes a sliding, spring biased latch 32 that prevents raccoons and other predators from unhooking the attaching means. Since hook and eye devices of this type are well known to those skilled in the art, further detailed discussion of the same is not deemed necessary.

Figure 12:
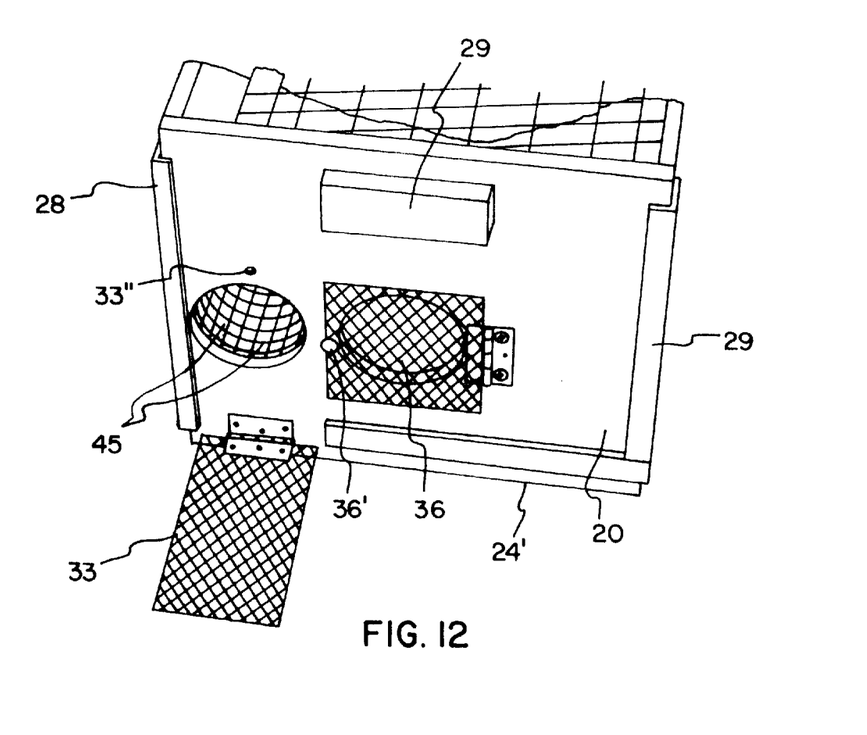
FIG. 12 is a front perspective view of the feeding and watering portion with the ingress and egress tunnel gate open.

The front wall 20 has a hinged ingress and egress tunnel gate 33 that covers the ingress and egress tunnel opening 34 with a locking thumb screw 33' that threads into a thumb screw base 33". Since thumb screws and their associated thumb screw bases are well known to those skilled in the art, further detailed discussion of the same is not deemed necessary.

Figure 13:
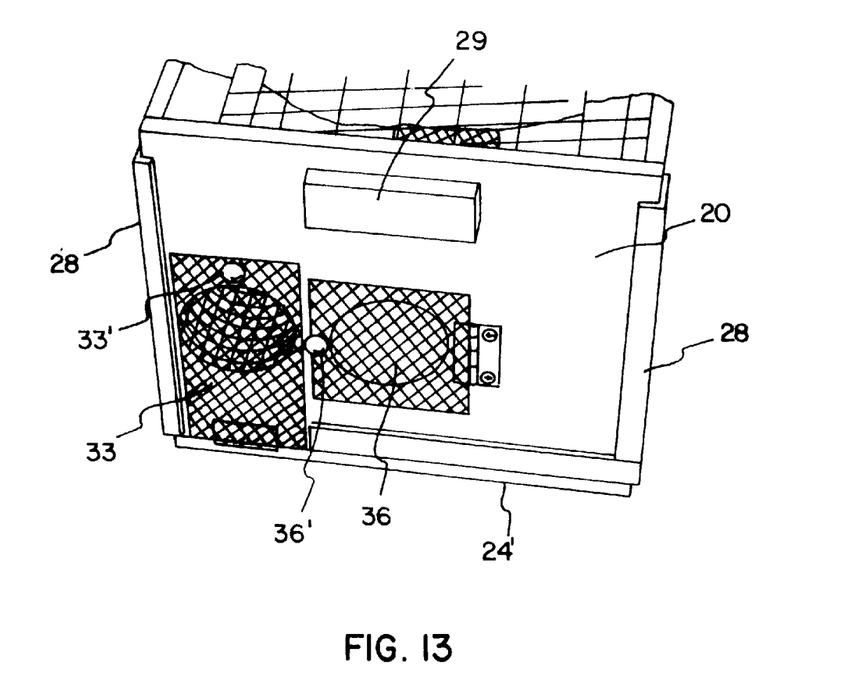
FIG. 13 a perspective view of the front of the feeding and watering portion with the tunnel gate and the call bird section gate closed.

Also in the front wall 20 is an opening 35 into the call bird section with a hinged gate 36 covering the same and is secured by thumb screw 36'.

Figure 14:
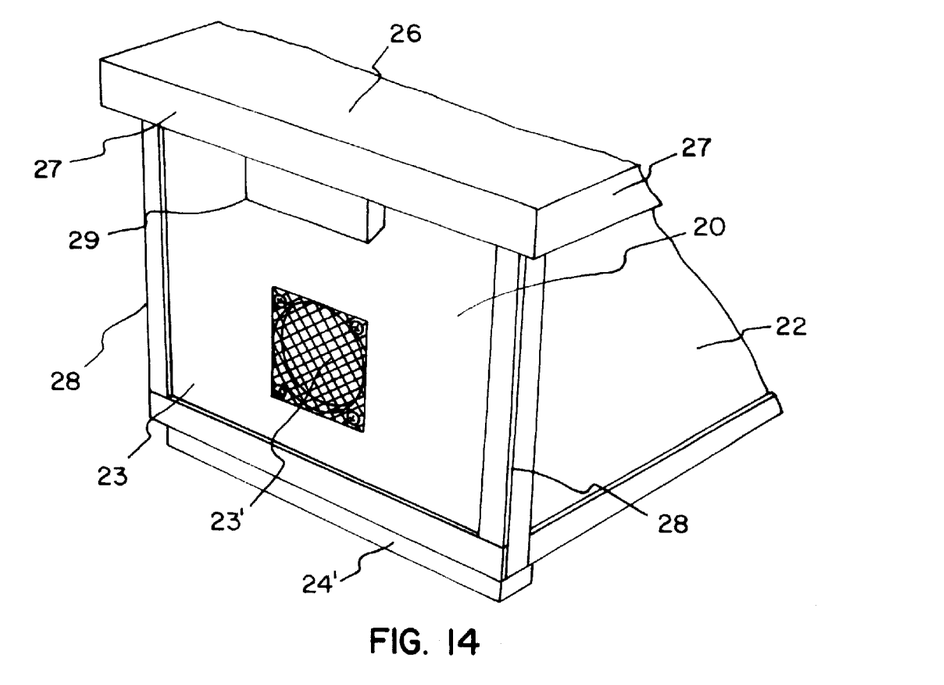
FIG. 14 is a perspective view of the rear wall showing the ventilation opening therein and the closed gate over the opening in the left side wall into the free ranging bird section.

An opening 37 into the free ranging bird section of the feed and watering portion 11 is provided in elongated left side wall 37 and is covered by hinged gate 38 that is secured in place by thumb screw 38'.

Figure 9:
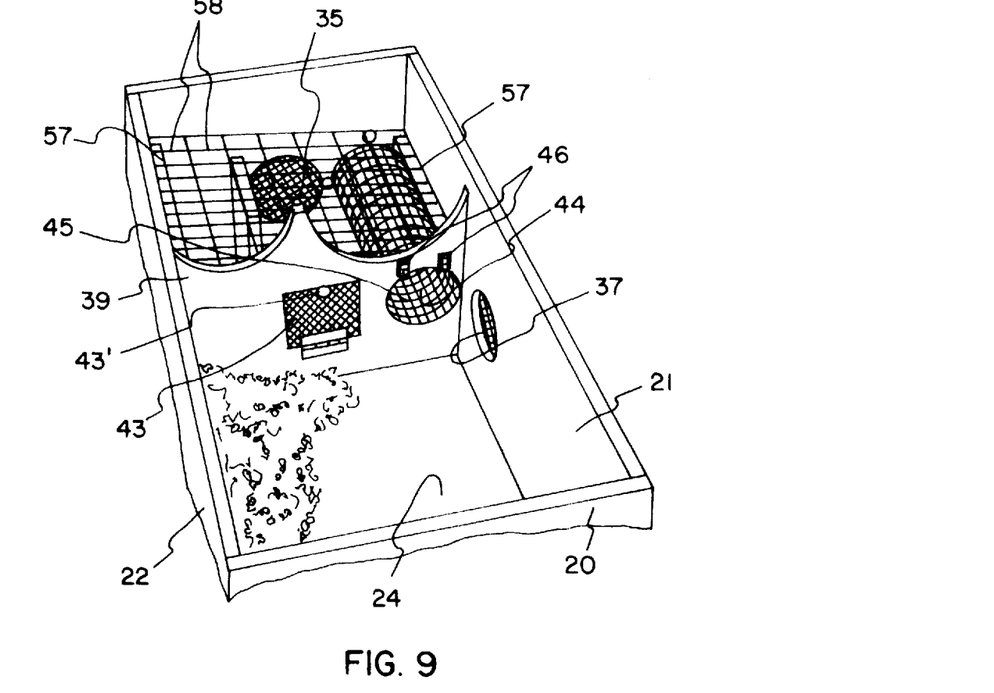
FIG. 9 is a perspective view of the interior of the feeding and watering portion with the molded watering and feeding tray removed.

A fixed interior wall or partition 39 is disposed approximately one third of the distance from front wall 20 to rear wall 23 as can clearly be seen in FIG. 9. This wall or partition separates the call bird section, indicated generally at 40 from the free ranging bird section, indicated generally at 41.

An opening 42 in the interior wall or partition 39 communicates between the call bird section 40 and the free ranging bird section 41. A bottom hinged gate 43 covers opening 42 and is secured in closed position by thumb screw 43'. A second opening 44 is provided in interior wall or partition 39. An ingress and egress tunnel 45 formed preferably from coated wire mesh connects the ingress and egress tunnel opening 34 in front wall 20 with the opening 44 in interior wall 39 as can clearly be seen in FIG. 9.

A pair of deformable gate hangers 46 are mounted above opening 44 in interior walls 39. Whenever it is decided to retain returning birds to the free ranging bird section 41 of the feeding and watering portion 11, a one-way gate 47 is pivotally mounted from gate hangers 46 as can clearly be seen in FIGS. 10 and 11. As the birds enter the free ranging bird section 41 through tunnel 45, they pivot the two downwardly projecting fingers of the one-way gate 47 upwardly to pass through opening 44. The gate 47 then swings back down. Since the distance between the downwardly projecting fingers of gate 47 are narrower than the birds, such birds are prevented from egressing back through the tunnel 45 to the exterior of the feeding and watering portion 11.

Figure 6:
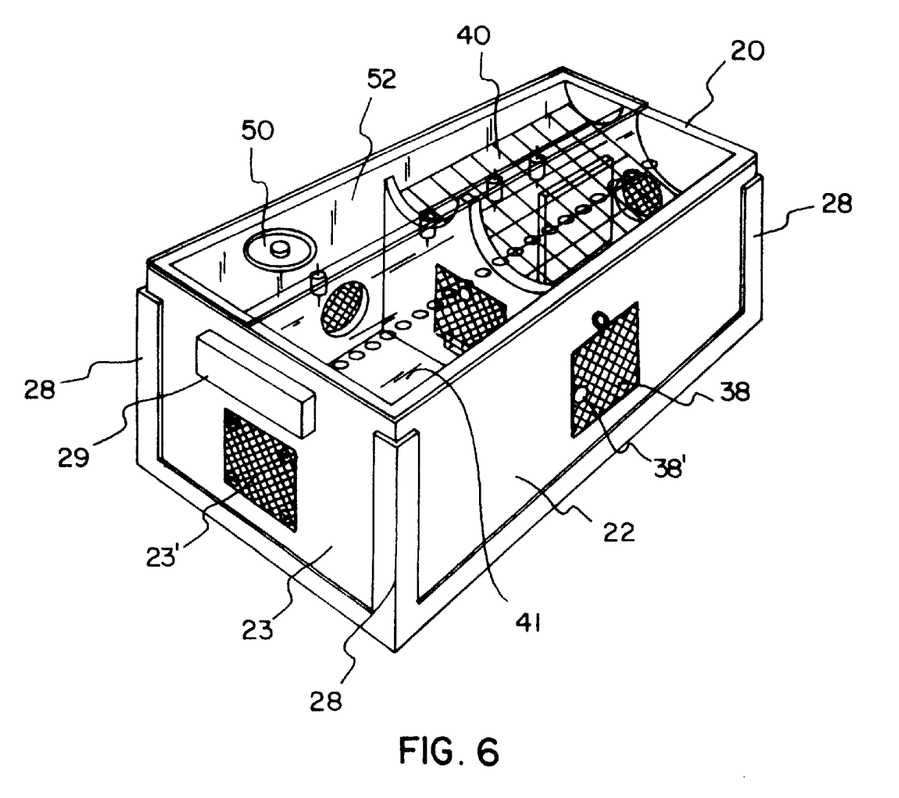
FIG. 6 is a top perspective view of the feeding and watering portion of the present invention with the molded watering and feeding tray in use position.

A watering and feeding tray 48 formed from clear molded plastic includes a peripheral lip 49 that rests on the upper edge of the front wall 20, side walls 21 and 22 and rear wall 23 as clearly shown in FIG. 6.

Figure 7:
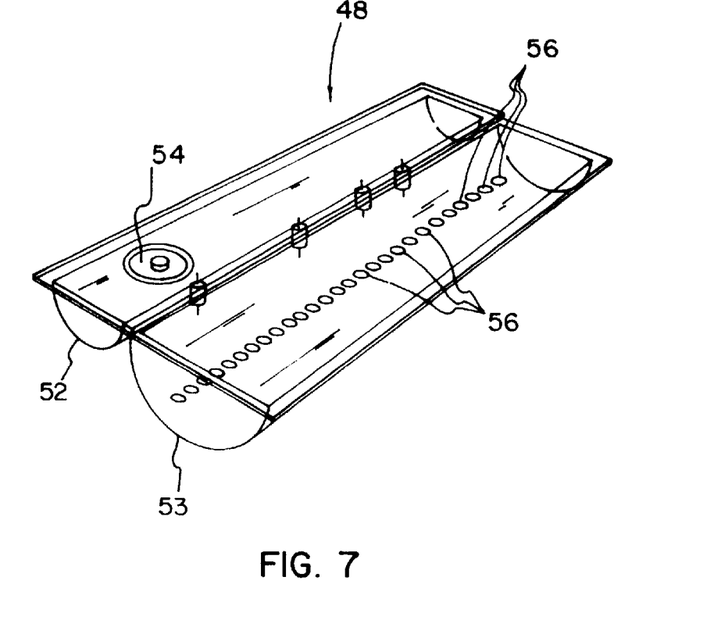
FIG. 7 is a top perspective view of the molded tray removed from the feeding and watering portion.
Figure 8:
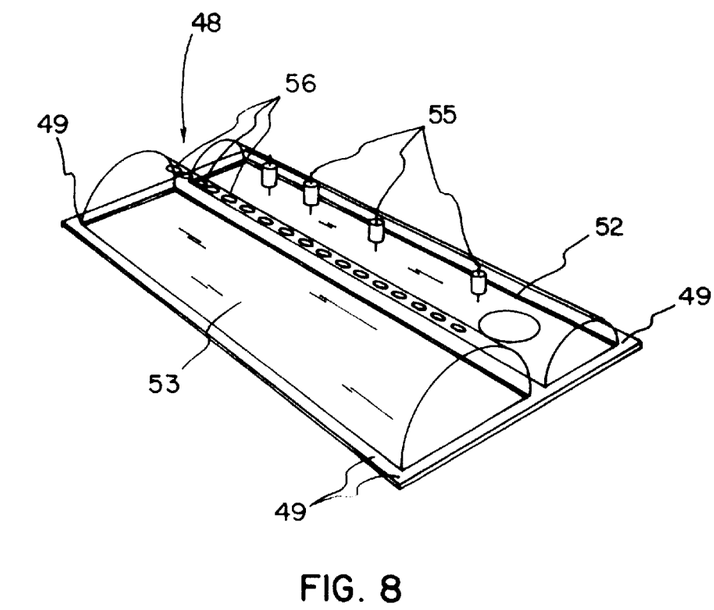
FIG. 8 is a bottom perspective view thereof.

A central flattened area 50 of tray 48 engages the flat interior tip 50' of interior wall or partition 39 between the arcuate cut-outs 51 conforming to the bottom of the watering and feeding tray 48.

The watering and feeding tray 48 includes an enclosed watering trough 52 and an open top feed trough 53. The watering trough 52 includes a closure 54 for a filling opening in the top and at least four watering nipples 55 on the bottom.

When in place as shown in FIG. 6, two of the watering nipples 55 will be in the call bird section 40 and at least two in the free ranging bird section 41. The reason for this is to provide a backup should one of the watering nipples become clogged. These nipples are commercially available, are extremely reliable and have been used world-wide for many years. Since they are so well known to those skilled in the art, further detailed discussion of the same is not deemed necessary.

In the bottom of the feeding trough 53 of tray 48 is provided a plurality of small openings or holes 56 which allows the birds in both the call bird section 40 and a free ranging section 41 to feed. These openings are so sized that the cooked ration being used can pass therethrough whenever the birds peck at such opening. Since trough feeding through openings in the lower portion thereof is well-known to those skilled in the art, further detailed discussion of this portion of the present invention is not deemed necessary.

Flanges 57 are provided on the interior of side walls 21 and 22 in the call bird section 40. A wide mesh wire screen 58 extends between the interior flanges 57 and is stapled or otherwise secured thereto. This wire screen is disposed adjacent the bottom of the arcuate cut-outs 51 in interior wall 39 so that the call bird or birds can get water and food from the watering and feeding tray 48 but cannot escape from the call bird section when the top closure 26 is removed.

A hiding partition 59 is mounted on and extends outwardly from the interior of front wall 20 partially across the call bird section 40. This partition allows the call bird or birds to move out of sight of the closed, perforated gate 36 in the front wall 20 when a predator approaches. This prevents the predator from seeing the call birds and also gives such bird or birds a comfort factor in being able to hide.

When using the present invention, the floor of the call bird section 40 and the free ranging bird section 41 is covered with no more than ½ inch of cedar chips. These chips are very aromatic and widely used in doghouses and pens to eliminate fleas other parasites.

The watering trough 52 can be partially filled and used to indicate when the feeding and watering portion is approximately level. The trough can then be filled to slightly less than full and the closure 54 put in place. The feed trough 53 is filled with preferably cooked ration (although natural feed could be used, it is not as dietarily balanced). The top closure 26 is latched with the hook and eyes to opposite side walls.

To get pen raised birds or captured wild birds acclimated to using the protected feeding and watering system of the present invention, the acclimation portion 12 is attached to the front wall of the feeding and watering portion by means such as wood screws or other fastening means. The blocking board 19 is removed from the acclimation portion and the bottom hinged gate 33 is opened. The one way gate 47 is, of course, at this point removed. The gate 43 can also be opened to allow the birds to go through partition 39 to access both the call bird section and the free ranging bird section.

A covey of between 20 and 30 birds can use the present invention. When they are placed in the feeding and watering portion 11, they will quickly learn to drink water from watering nipples 55 and feed from the feed trough 53. Since quail roost in a tail in, head out covey circle, they will not roost inside of the feeding and watering portion 11 if they are allowed to egress therefrom. Thus, they will roost in the acclimation portion 12 and will enter the feeding and watering portion 11 during mid morning and mid afternoon to feed and at noon and late afternoon for watering.

It has been found through experience that leaving the birds in the connected acclimation portion and feeding and watering portion for six to seven days will get them used to the system. Every two to three days during this time, the connected portions should be moved several feet for sanitation purposes since the droppings of the birds will be on the ground underneath the acclimation portion.

At the end of the acclimation period when the birds are out of the feeding and watering section, gate 43 in partition 39 is closed. The gate over opening 13 in the acclimation portion 12 is then opened and the birds forced through the wire mesh tunnel 45 into the interior of the feeding and watering portion 11. The tunnel gate 33 is then be closed and the acclimation portion 12 removed, cleaned and stored for later use.

Once the birds are all in the free ranging bird section 41, gate 38 is opened giving access through opening 37 into said section. A rooster, and one or more other birds if desired, can be removed from the free ranging section and placed through opening 35 into the call bird section 40. All gates are then closed.

The feeding and watering portion 11 can now be moved to the restoration site and the front wall with the ingress and egress tunnel opening 34 therein placed in underbrush, briar thickets or similar protected areas. If such protection is not naturally available, then brush, weeds and the like should be placed adjacent to and above the tunnel entrance 34 so the birds are protected from predators as they enter and leave the tunnel 45.

The one way gate 47 is removed if previously installed and the tunnel gate 35 opened. The birds are now free to ingress and egress from the free ranging bird section.

Since it usually takes two to three hours for the birds to leave the feeding and watering portion 11 after the gate 33 adjacent tunnel 45 is opened, that at least four hours of daylight should be available after opening gate 33.

When the birds leave the protected feeding and watering portion 11 they will not be hungry or thirsty and thus have more time to watch for predators. When the covey gets scattered from either hunting or the approach of a predator, the rooster in the call bird section will give his bob white call that will bring the covey back to the area adjacent the feeding and watering portion 11. As heretofore mentioned, the birds can feed and water at their normal time of day in the protection of the feeding and watering portion, yet can free range at other times and can roost outside in their natural manner.

Figure 10:
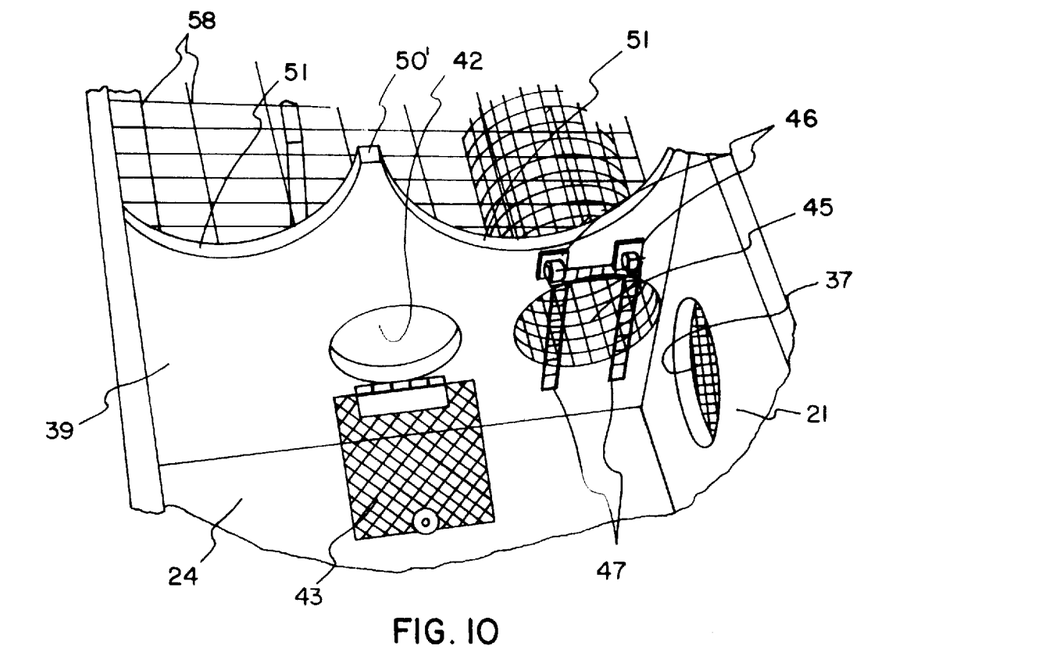
FIG. 10 is an enlarged perspective view of the interior wall separating the call bird section from the free ranging bird section.
Figure 11:
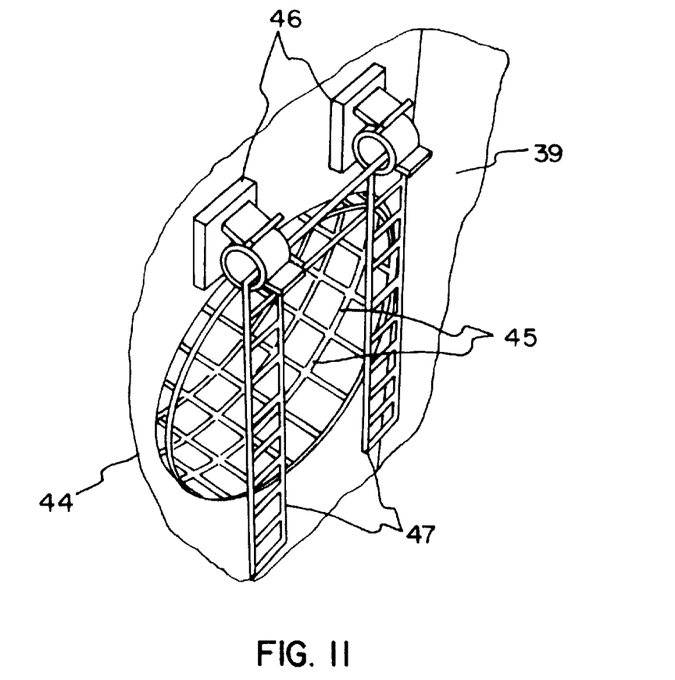
FIG. 11 is a further enlarged perspective view of the gate hanger with the one-way gate in place.

Approximately two weeks after the birds have been allowed to freely ingress and egress, gate 38 can be opened and by reaching through the opening 37, gate 43 can be opened as shown in FIG. 10. This allows the call bird or call birds to leave the call bird section 40 and allows the covey to free range in both sections 40 and 41.

The tray 48 holds approximately two gallons of water and 25 pounds of feed. The feed and water should be checked every two to three weeks to determine how much water and feed is being consumed. Thereafter the interval between refilling can be adjusted as necessary. Experience has shown that during the warmer months of the year, the feed needs to be replenished less often than in the winter due to natural feed being more abundant outside of the enclosure of the present invention.

If a covey gets down to an undesirable number due to hunting, predators or other reasons, the covey can be replenished by putting additional birds in the acclimation portion 12, with the blocking board 19 in place to prevent their escape. Portion 12 can then be moved up adjacent front wall 20 and the tunnel gate 33 opened. The blocking board 19 is then removed from the acclimation portion 12 and the new birds forced from such portion through tunnel 45 into the free ranging bird section 41.

Gate 43 in interior partition 39 is closed and a rooster and another bird, if desired, can be placed in the call bird section. The acclimation portion 12 is then removed from the feed and watering portion 11, can be cleaned and stored until used again. The tunnel gate 33 in front wall 20 is left open.

Two weeks later when gate 43 in partition 39 is opened to allow the call birds to rejoin the remainder of the covey and to give access to the entire enclosure, the new birds will have bonded with the other birds. This allows the new birds to learn fear of predators and other wilderness traits.

Since the protected feeding and watering system for upland birds of the present invention can be used year-round, a watering tube with watering nipples can be mounted just above the floor 24 in the feeding and watering portion 11 so that young birds, after hatching, can have water to drink. When the adult birds pick their food ration from the feed trough 53, feed will drop on the floor 24 and be available to chicks as well as the adult birds. A suitable ramp means will, of course, need to be in place on both ends of tunnel 45 to allow the chicks to ingress and egress.

Although the protected feeding and watering system for upland game birds of the present invention has been described in conjunction with quail generally and bobwhite quail in particular, it is understood that by increasing the frontal hole size and the height of the box to accommodate the species, any other upland game birds such as chuckars, Hungarian partridge, grouse, pheasants and the like can use the present invention to increase their population.

Multiple protected feeding and watering systems for upland game birds can be used at the same time to restore bird populations to the golden years when upland game birds were plentiful.

The terms "front", "rear", "side", "top", "bottom" and so forth have been herein merely for convenience to describe the present invention and its parts as oriented in the drawings. It is to be understood, however, that these terms are in no way limiting to the invention.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

I claim:

1. A replenishment system for wild upland game birds comprising: a stand alone predator resistant enclosure means having an interior and exterior;

refillable feed and watering means disposed interiorly of said enclosure means to allow birds to feed and drink within the safety of such enclosure means;

a tunnel like member disposed primarily interiorly of said enclosure and communicating between the interior and exterior of the enclosure means, the cross-section of said tunnel like member being large enough to allow the birds to freely ingress and egress into and out of the enclosure means while being too small for predators to enter; and a closeable gate means to prevent the birds from egressing through the tunnel like member whereby the predator resistant enclosure means with the birds inside can be transported to a release area and when the birds are in the wild, they can spend more time being aware of their surroundings than looking for food and water.

2. The system of claim 1 wherein the predator resistant enclosure includes a separate call bird section.

3. The system of claim 1 wherein the refillable feed and watering means includes a feed trough and a watering trough.

4. The system of claim 3 wherein openings are provided in the lower portion of the trough whereby the birds can peck food therefrom.

5. The system of claim 3 wherein the watering trough includes a plurality of watering nipples from which the birds can drink.

6. The system of claim 3 wherein the feeding and watering means is a molded, one piece feeding trough and watering trough.

7. The system of claim 1 wherein an acclimation enclosure is mounted juxtaposed to the tunnel like member whereby the birds can become acclimated to the system prior to being allowed to free range into and out of the predator resistant enclosure.

8. The method of restoring upland game birds to the wild comprising:

providing a protected, stand alone predator resistant enclosure means having an interior and exterior;

placing automatic feeding and watering means inside said enclosure means; and allowing the birds to freely ingress and egress into and out of the enclosure means through a tunnel like member disposed primarily interiorly of said enclosure, the cross-section of said tunnel like member being large enough for the birds to pass through while being too small for predators to enter.

9. The method of claim 8 wherein an acclimation enclosure is temporarily mounted adjacent the ingress and egress opening in the predator resistant enclosure means whereby the birds can freely ingress and egress into and out of such enclosure while being contained within the acclimation enclosure.

10. The method of claim 9 wherein at least one call bird is temporarily isolated from the other birds when the predator resistant enclosure is first placed in the restoration area.

11. The method of restoring upland game birds to the wild comprising; constructing a stand alone predator resistant enclosure means having automatic feeding and watering means therein and an opening through which the birds can ingress and egress into and out of said enclosure means;

placing a temporary acclimation enclosure adjacent the ingress and egress opening in the stand alone enclosure means to temporarily restrict the movement of the game birds outside of such enclosure means;

removing the acclimation enclosure after a predetermined number of days; and placing the stand alone enclosure means where the game birds are to be replenished in the wild whereby such birds can feed and water in the protected confines of the predator resistant enclosure means and can freely range and roost outside thereof.

* * * * *